United States Patent [19]

Krenecki

[11] Patent Number: 5,062,166
[45] Date of Patent: Nov. 5, 1991

[54] OVERFLOW CONTROL APPARATUS FOR WATER CLOSETS

[76] Inventor: Tom Krenecki, 1761 Las Raposas, Santa Rosa, Calif. 95405

[21] Appl. No.: 583,494

[22] Filed: Sep. 17, 1990

[51] Int. Cl.$^5$ ............................................. E03D 11/02
[52] U.S. Cl. ............................................. 4/427; 4/415
[58] Field of Search ................................. 4/427, 415

[56] References Cited

U.S. PATENT DOCUMENTS

| | | | |
|---|---|---|---|
| 3,885,253 | 5/1975 | Overbey | 4/67 |
| 4,170,049 | 10/1979 | Gilliland | 4/427 |
| 4,195,374 | 4/1980 | Morris et al. | 4/427 |
| 4,348,778 | 9/1982 | Rau | 4/661 |
| 4,391,003 | 7/1983 | Talerico | 4/415 |
| 4,651,359 | 3/1987 | Battle | 4/324 |
| 4,709,427 | 12/1987 | Laverty, Jr. | 4/427 |

Primary Examiner—Charles E. Phillips
Attorney, Agent, or Firm—Phillips, Moore, Lempio & Finley

[57] ABSTRACT

The tank of a water closet has an overflow control apparatus operatively associated therewith for selectively applying a closing force to a flush valve, adapted for movement between an open position communicating water from the tank to a bowl of the water closet and a closed position stopping such communication. In the preferred embodiment of this invention, the overflow control apparatus comprises a weighted plunger reciprocally mounted in the tank, above the flush valve, for being selectively released by a reciprocal trip member to apply the closing force to the flush valve. Release is effected automatically in response to the water in the bowl exceeding a predetermined level and pivoting of a float mounted in the bowl.

14 Claims, 2 Drawing Sheets

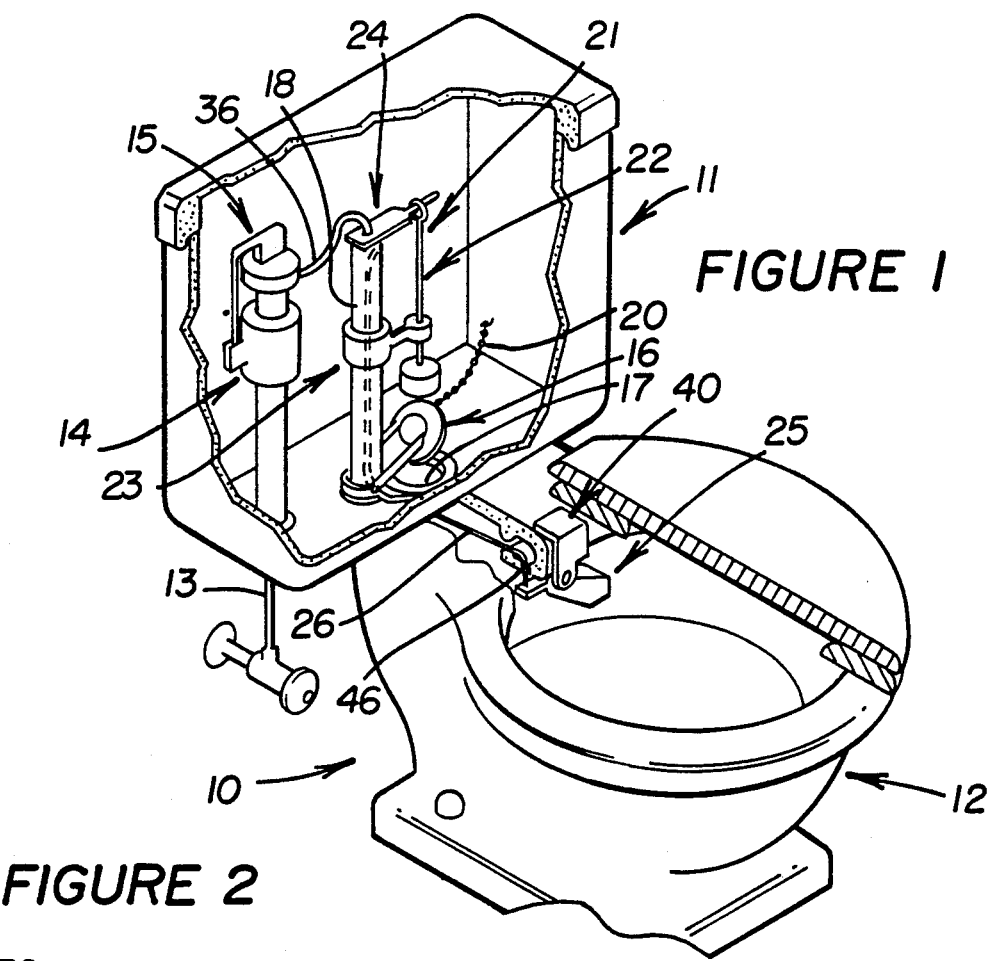
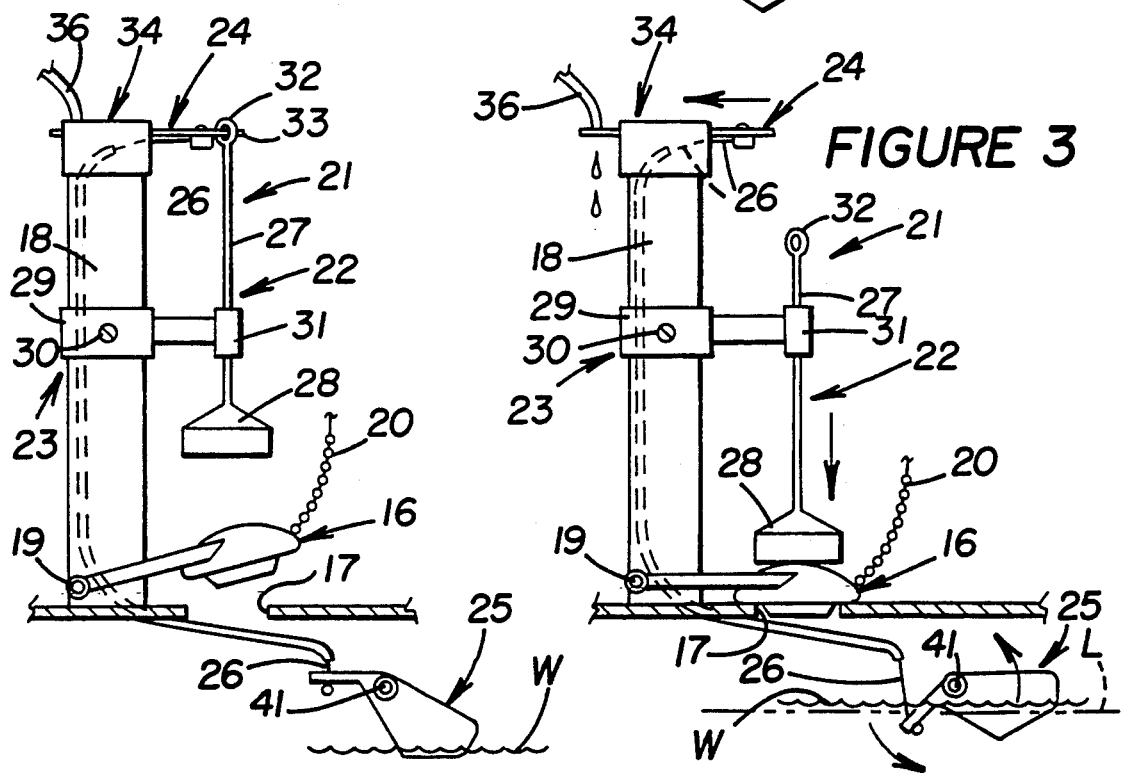

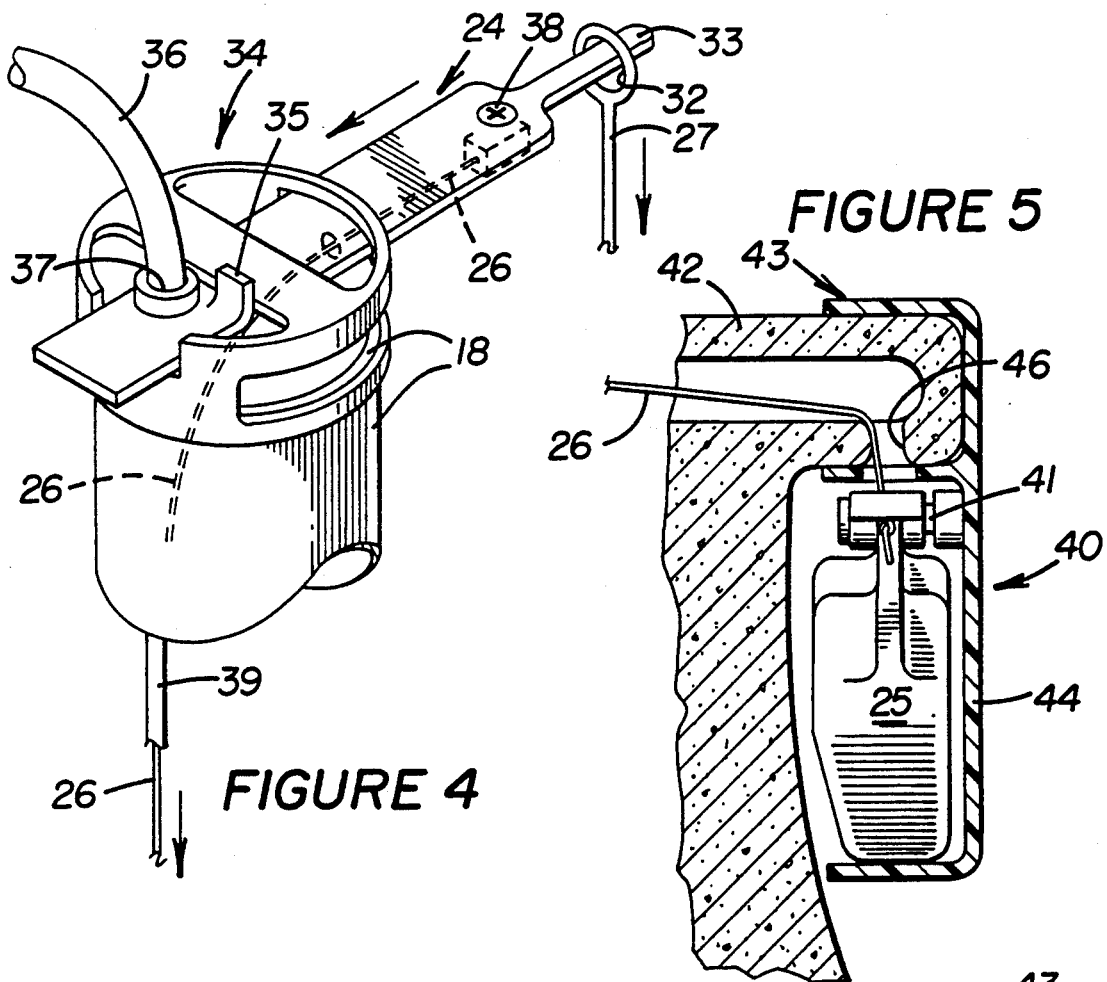
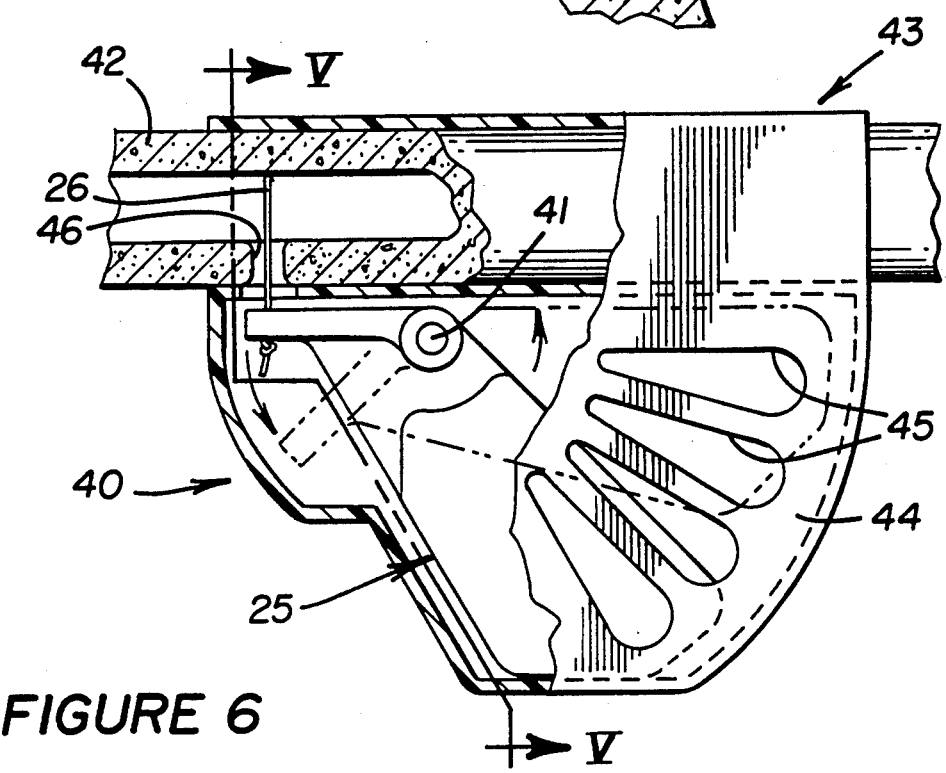

OVERFLOW CONTROL APPARATUS FOR WATER CLOSETS

TECHNICAL FIELD

This invention relates to control apparatus for water closets and more particularly to an apparatus for automatically stopping overflow of the toilet bowl of a water closet.

BACKGROUND OF THE INVENTION

The overflow of a toilet bowl is a recurring problem. Unless stopped, the overflowing water can cause substantial damage to floors, ceilings, carpets and the like. The overflow problem normally occurs when the trap of the toilet bowl becomes clogged with a rag or like obstruction and the toilet bowl is flushed. Since the tank contains approximately from three and one-half to seven gallons of water, the limited-capacity bowl is incapable of containing the water to prevent overflow from occurring.

The acumen of the average person is such that closing of the standard flush or flapper valve to prevent water flow from the tank to the bowl is often-times too time consuming or overlooked. The flush valve, when opened, will communicate unrestricted water flow from the tank to the bowl until the tank is substantially emptied. Further, the standard ball cock will open an intake valve to further communicate water under line pressure to the bowl, via a refill tube and overflow tube, to aggravate the overflow problem.

SUMMARY OF THE INVENTION

An object of this invention is to provide an economical and efficient overflow control apparatus for a water closet whereby overflow of water from the toilet bowl of the water closet is prevented when the trap of the bowl becomes clogged.

The overflow control apparatus is adapted for use with a standard water closet having a tank, a vertically disposed overflow tube mounted in the tank, a bowl refill tube communicating with the overflow tube, a bowl, a flush valve, and apparatus for selectively moving the flush valve to its open position. The overflow control apparatus comprises shut-off means for applying a closing force to the flush valve to move it from its open position and to hold it at its closed position.

The shut-off means comprises a reciprocal plunger reciprocally mounted on the overflow tube, vertically above the flush valve, for being released from a raised position to a lowered position for applying the closing force to the flush valve. A trip member is movably mounted on an upper end of said overflow tube for movement from a first position engaging the plunger means to hold it in its raised position to a second position releasing the plunger.

The trip member could be manually manipulated to permit it to drop to its lowered position and to reset the trip member after the clogging problem has been remedied. In the preferred embodiment of this invention, a control means is provided to automatically move the trip member from its first position to its second position in response to the water in the bowl exceeding a predetermined level.

Also in the preferred embodiment of this invention, the distal end of the bowl refill tube is connected to the trip member to normally communicate with the overflow tube and is automatically moved out of communication therewith when the trip member moves to its second position.

BRIEF DESCRIPTION OF THE DRAWINGS

Other objects and advantages of this invention will become apparent from the following description and accompanying drawings wherein:

FIG. 1 is a partially sectioned, isometric view of a water closet comprising a tank, a bowl and an overflow control apparatus of this invention mounted therein;

FIGS. 2 and 3 schematically illustrate a plunger of the overflow control apparatus in a normal raised position and a lowered closing position on a flush valve, respectively;

FIG. 4 is an enlarged isometric view showing the mounting of a trip member of the apparatus on an overflow tube of the water closet;

FIG. 5 is an enlarged sectional view, taken in the direction of arrows V—V in FIG. 6, illustrating a float assembly of the apparatus; and FIG. 6 is a partially sectioned front elevational view of the float assembly.

DESCRIPTION OF THE PREFERRED EMBODIMENTS

FIG. 1 illustrates a standard water closet 10 comprising a tank 11 and a bowl 12. A water line 13 is connected to an underside of the tank to communicate pressurized tap water thereto under control of a standard reciprocating-type ball cock 14 and intake valve 15. A standard flush handle (not shown) is pivotally mounted on a frontal sidewall of tank 11 for selectively moving a standard flush valve 16 to its raised, open position for flushing purposes. Water is thus communicated from tank 11 to bowl 12, through a flush valve opening and seat 17 in a conventional manner.

Flush valve 16 is shown in the form of a standard elastomeric flapper valve pivotally mounted on a vertically disposed overflow tube 18 at a point pin 19. Flush handle-actuated linkage means includes a chain 20 interconnected between the flapper valve and a distal end of a trip lever (not shown) in a conventional manner. The trip lever normally has its proximal end connected for pivotal movement to the flush handle. The pivotal flapper valve will return automatically to its closed position, under the influence of gravity, to stop such communication, after the tank has substantially emptied and the bowl has been flushed in a normal manner.

Referring to FIGS. 1-3, this invention is directed to an overflow control apparatus 21 that includes shut-off means to move flush valve 16 from its open position (FIG. 2) to its closed position (FIG. 3) by applying a closing force to the flush valve and holding it at its closed position to prevent overflow of bowl 12. Such overflow condition of the bowl normally arises when the trap of the bowl becomes clogged with rags or the like. Tripping of the flush handle (not shown) to empty the water closet, when the trap is clogged, will communicate approximately from three and one-half to seven gallons of water from tank 11 to bowl 12 via opening and seat 17. Since the capacity of the bowl is substantially less than this amount, the bowl will overflow, unless flush valve 16 is closed by overflow control apparatus 21.

Referring to FIGS. 2 and 3, the shut-off means comprises a plunger 22 reciprocally mounted on a bracket 23, secured to overflow tube 18. FIG. 2 illustrates the plunger in its raised position, vertically above flush valve 16, during normal operation of the water closet. As shown in FIG. 3, when the bowl becomes clogged and water W therein exceeds a predetermined level L, the plunger will be released and fall to a lowered position under the influence of gravity. The plunger will thus apply a closing force to the flush valve to engage and move the valve from its open position (FIG. 2) and to hold it at its closed position.

A trip member 24 is movably mounted on an upper end of overflow tube 18 for movement from a first position engaging the plunger to hold it in its raised position (FIG. 2) to a second position releasing the plunger to permit it to drop to its lowered position on the flush valve (FIG. 3). Although the trip member could be manually manipulated, a control means for automatically moving the trip member from its first to its second position is preferred. The control means comprises a plastic or hollow-metal float 25 mounted within bowl 12 for moving in response water W in the bowl rising above predetermined level L. In addition, the automated control means comprises actuating means responsive to movement of trip member 24, shown in the form of a reciprocal wire or cable 26 interconnected between the float and trip member.

As further shown in FIGS. 2 and 3, plunger 22 comprises a vertically disposed stem or rod 27 having a suitable weight 28 secured at its lower end for effecting the closing function of flush valve 16 (FIG. 3). Bracket 23 has a cylindrical collar 29 suitably secured to overflow tube 18 by a set screw 30 or the like. A guide collar 31 is secured on the bracket to provide guide means for reciprocally mounting stem 27 of the plunger therein.

Referring to FIG. 4, an upper end of stem 27 has an eyelet 32 formed thereon to normally engage over a narrowed distal end 33 of reciprocal trip member 24. The trip member is shown in the form of a flat plate slidably mounted on a cap 34, suitably attached over the exposed upper end of overflow tube 18. A stop member 35 is preferably secured on the trip member to provide stop means, engaging a cross strut of the cap, for normally holding the trip member in its extended or first position shown in FIG. 4.

The distal end of a standard elastomeric and flexible refill tube 36 is secured and anchored within a bore 37 suitably formed through trip member 24, to normally communicate pressurized water into the upper end of the overflow tube in a conventional manner. A shown in FIG. 3, when the trip member is moved to its retracted or second position to release plunger 22, the refill tube will move automatically with the trip member to then communicate pressurized water exteriorly of the overflow tube and into tank 11 directly. Thus, such water is prevented from entering through the overflow tube and into bowl 12 when the water closet is in a clogged condition.

FIG. 4 further illustrates securance of a first end of reciprocal cable 26 adjacent to the distal end of trip member 24 by a set screw 38 or other standard attachment means. A protective sheath 39 for cable 26 may be suitably secured within overflow tube 18 to guide reciprocal movements of the cable. As shown in FIGS. 4, the first end of cable 26 is suitably guided through an opening formed through a side wall of cap 34, below trip member 24, to accommodate and guide reciprocal movements of the cable.

FIGS. 5 and 6 illustrate a preferred embodiment of the float assembly of the automated control means for automatically releasing plunger 22 when the water level in bowl 12 exceeds predetermined level L (FIG. 3). Float 25 of the float assembly is pivotally mounted on a combined stationery bracket and housing 40 by a pivot pin 41. Bracket and housing 40 is suitably mounted on a rim 42 of bowl 12 by a generally U-shaped bracket 43 and is secured thereon by a suitable epoxy adhesive or the like.

A cage-like member 44 having a plurality of vent openings 45 formed therethrough substantially encloses float 25 to maintain the float in operative condition. If so desired, member 44 could be suitably hinged on bracket 43 for cleaning or repair purposes. A second end of reciprocal cable 26 extends from the lower open end of overflow tube 18, through one of a plurality of standard vent holes 46 formed through annular rim 42 of bowl 12 and is attached to float 25.

In operation, when water W in bowl 12 exceeds level L (FIG. 3), float 25 will pivot counterclockwise from its normal horizontal position shown in FIG. 2, about pin 41. When the float pivots a pre-set amount, cable 26 will retract trip member to its FIG. 3 position to release plunger 22, under the influence of gravity, and close flush valve 16. Simultaneously therewith, fill tube 36 will move out of communication with overflow tube 18. After the blockage is cleared, trip member 24 can be returned manually to its normal position to engage its distal end 33 within eyelet 32 of plunger 22 (FIG. 4). Stop member 35 insures that the trip member will be precisely set.

I claim:

1. Overflow control apparatus in combination with a water closet having a tank, a vertically disposed overflow tube mounted in said tank, a bowl refill tube having its distal end communicating with an open upper end of said overflow tube, a bowl, flush valve means movable between a normally closed position stopping communication of water from said tank to said bowl, and an open position communicating water from said tank to said bowl, and means for selectively moving said flush valve means to its open position, said overflow control apparatus comprising shut-off means for applying a closing force to said flush valve means to move it from its open position and to hold it at its closed position, said shut-off means comprising reciprocal plunger means reciprocally mounted on said overflow tube, vertically above said flush valve means, for being released and dropped vertically under the influence of gravity from a raised position to a lowered position for applying said closing force to said flush valve means to move it from its open position and to hold it at its closed position, trip means movably mounted on said overflow tube for movement from a first position for holding said plunger means in its raised position to a second position releasing said plunger means to permit it to drop to its lowered position, and control means for moving said trip means from its first position to its second position, the distal end of said bowl refill tube being secured to said trip means to communicate pressurized water into the upper end of said overflow tube when said trip means is in its first position and movable with said trip means to communicate pressurized water exteriorly of said overflow tube and into said tank directly when said trip means is moved to its second position by said control means.

2. The overflow control apparatus of claim 1 wherein said plunger means comprises a plunger having a stem and a weight secured on a lower end of said stem and further comprising guide means secured on said overflow tube for reciprocally mounting the stem of said plunger thereon.

3. The overflow control apparatus of claim 1 wherein said trip means comprises a trip member slidably mounted on an upper end of said overflow tube.

4. The overflow control apparatus of claim 3 wherein said trip member comprises a plate member having proximal and distal ends and wherein the distal end of said plate member normally engages an upper end of a stem of said plunger to hold said plunger in its raised position.

5. The overflow control apparatus of claim 4 wherein the upper end of said stem has an eyelet formed thereon and wherein the distal end of said plate member normally engage within said eyelet to hold said plunger in its raised position.

6. The overflow control apparatus of claim 1 or 4 further comprising a cap mounted on the upper end of said overflow tube and wherein said trip means is mounted on said cap.

7. The overflow control apparatus of claim 1 or 4 further comprising stop means for normally holding said trip means in its first position.

8. The overflow control apparatus of claim 1 wherein said control means comprises automated control means for automatically releasing said plunger means from its raised position in response to the water in said bowl exceeding a predetermined level.

9. The overflow control apparatus of claim 8 wherein said automated control means comprises float means movably mounted within said bowl for moving from a first position to a second position in response to water exceeding said predetermined level and actuating means for disengaging said trip means from said plunger means in response to movement of said float means.

10. The overflow control apparatus of claim 11 wherein said actuating means comprises cable means interconnected between said float means and said trip means for moving said trip means from its first position to its second position automatically in response to movement of said float means to its second position, said cable means extending through said overflow tube.

11. Overflow control apparatus in combination with a water closet having a tank, a vertically disposed overflow tube mounted in said tank, a bowl refill tube having its distal end communicating with an open upper end of said overflow tube, a bowl, flush valve means movable between a normally closed position stopping communication of water from said tank to said bowl and an open position communicating water from said tank to said bowl, and means for selectively moving said flush valve means to its open position, said overflow control apparatus comprising shut-off means for applying a closing force to said flush valve means to move it from its open position and to hold it at its closed position, said shut-off means comprising reciprocal plunger means reciprocally mounted on said overflow tube, vertically above said flush valve means, for being released and dropped vertically under the influence of gravity from a raised position to a lowered position for applying said closing force to said flush valve means to move it from its open position and to hold it at its closed position, trip means movably mounted on said overflow tube for movement from a first position for holding said plunger means in its raised position to a second position releasing said plunger means to permit it to drop to its lowered position, control means for moving said trip means from its first position to its second position, and a cap fixedly securely mounted on the upper end of said overflow tube and wherein said trip means is slidably mounted on said cap.

12. An overflow control apparatus kit adapted for use with a water closet having a tank, a vertically disposed overflow tube mounted in said tank, a bowl refill tube having its distal end communicating with an open upper end of said overflow tube, a bowl, a flush valve movable between a normally closed position stopping communication of water from said tank to said bowl and an open position communicating water from said tank to said bowl, and means for selectively moving said flush valve to its open position, said kit comprising a weighted plunger, bracket means adapted for attachment to said overflow tube to reciprocally mount said plunger vertically above said flush valve, and trip means adapted for attachment to said overflow tube for movement from a first position normally holding said plunger in a raised above said flush valve to a second position releasing said plunger to permit it to drop under the influence of gravity to a lowered position closing said flush valve, said trip means being adapted to have a distal end of said refill tube attached thereto to normally communicate pressurized water into the upper end of said overflow tube when said trip means is in its first position and to be moved to communicate said pressurized water into said tank directly in response to movement of said trip means to its second position.

13. The overflow control apparatus kit of claim 12 further comprising float means adapted for attachment to a rim of said bowl for movement from a first position to a second position in response to the water in said bowl exceeding a predetermined level, and cable means adapted for attachment between said trip means and said float means for moving said trip means to its second position automatically in response to movement of said float means to its second position.

14. The overflow control apparatus of claim 12 or 13 wherein said trip means comprises a trip member slidably mounted on a cap adapted for attachment to an upper end of said overflow tube and wherein a distal end of said trip member is adapted to engage an upper end of said plunger to normally hold it in its raised position.

* * * * *

UNITED STATES PATENT AND TRADEMARK OFFICE
CERTIFICATE OF CORRECTION

PATENT NO. : 5,062,166
DATED : November 5, 1991
INVENTOR(S) : Tom Krenecki

It is certified that error appears in the above-identified patent and that said Letters Patent is hereby corrected as shown below:

Column 5

Claim 10, line 40, change "11" to -- 9 --.

Signed and Sealed this

Sixth Day of April, 1993

Attest:

STEPHEN G. KUNIN

Attesting Officer

Acting Commissioner of Patents and Trademarks